Sept. 2, 1958 E. E. BARTLETT 2,849,838
MOLD FOR THE MANUFACTURE OF LAMP CHIMNEYS
Filed Nov. 3, 1954 3 Sheets-Sheet 1

INVENTOR.
EDWARD E. BARTLETT
BY
Green, McCallister and Miller
HIS ATTORNEYS.

Sept. 2, 1958  E. E. BARTLETT  2,849,838
MOLD FOR THE MANUFACTURE OF LAMP CHIMNEYS
Filed Nov. 3, 1954  3 Sheets-Sheet 2
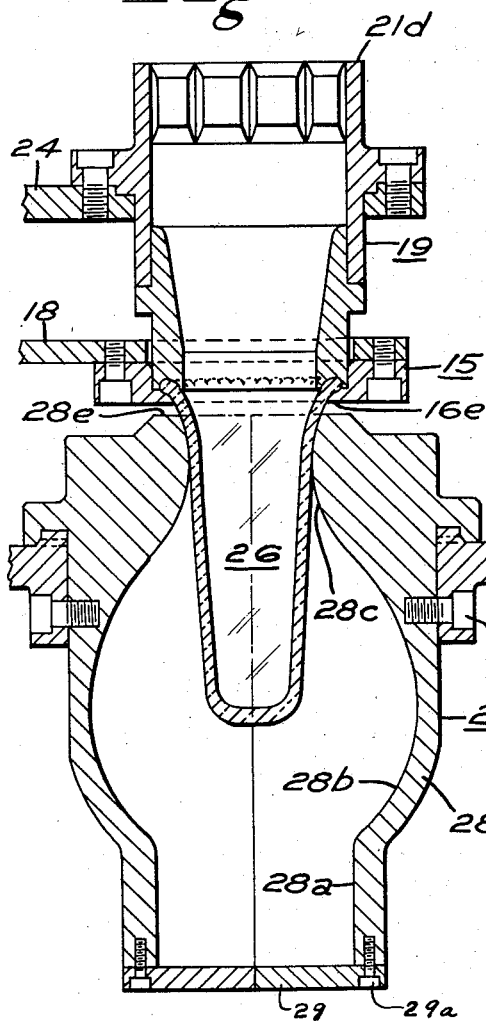
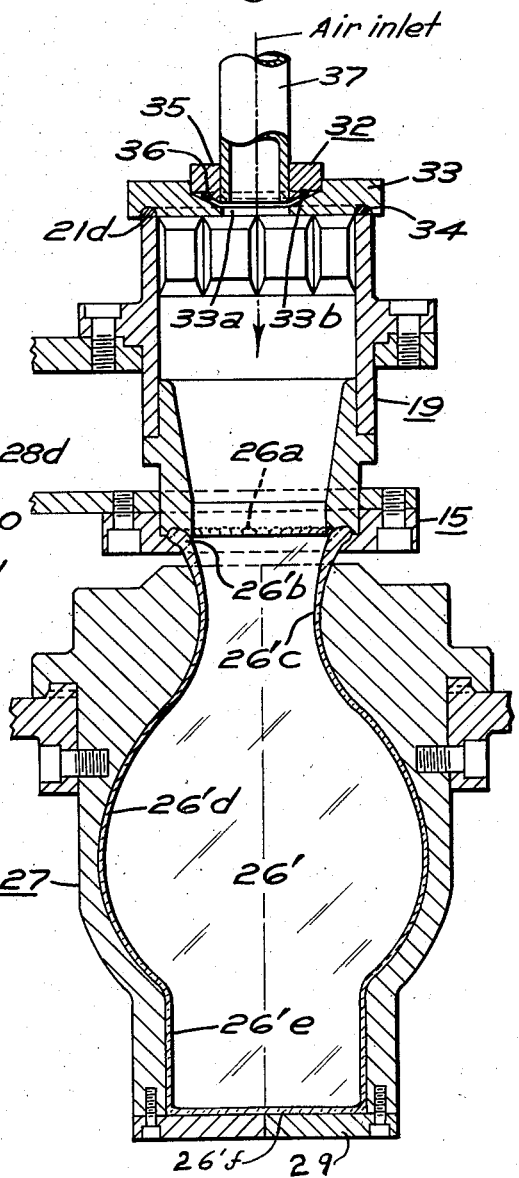
INVENTOR.
EDWARD E. BARTLETT
BY
Green, McCallister and Miller
HIS ATTORNEYS.

Sept. 2, 1958  E. E. BARTLETT  2,849,838
MOLD FOR THE MANUFACTURE OF LAMP CHIMNEYS
Filed Nov. 3, 1954  3 Sheets-Sheet 3
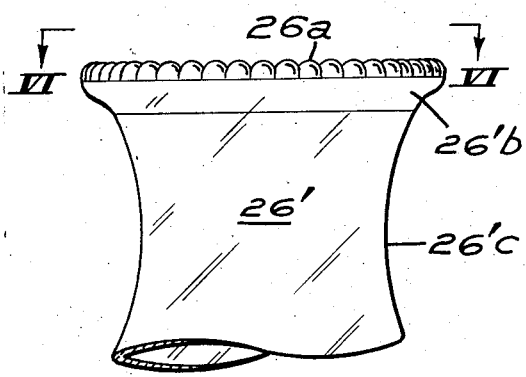
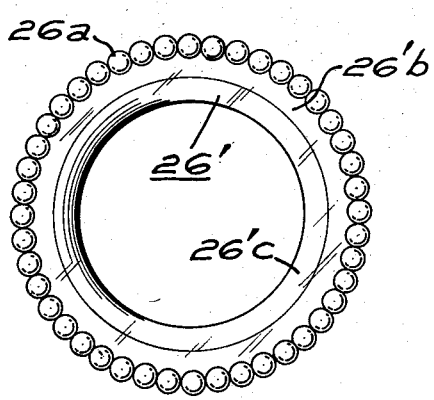
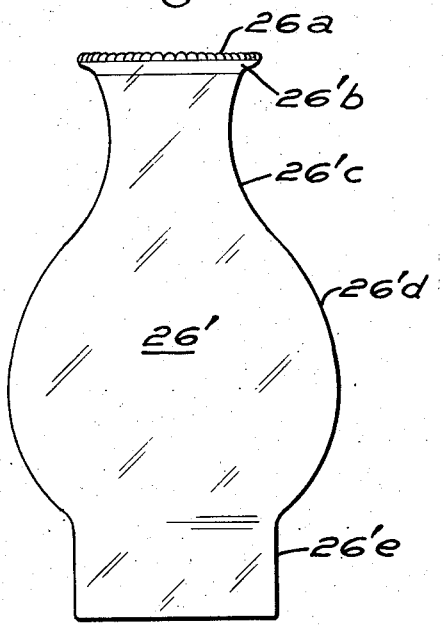
INVENTOR.
EDWARD E. BARTLETT
BY
*Green, McCallister and Miller*
HIS ATTORNEYS.

United States Patent Office 2,849,838
Patented Sept. 2, 1958

2,849,838

MOLD FOR THE MANUFACTURE OF LAMP CHIMNEYS

Edward E. Bartlett, Brownsville, Tex.

Application November 3, 1954, Serial No. 466,555

4 Claims. (Cl. 49—72)

This invention relates to the making of articles, such as glassware, from vitreous, plastic and similar materials which have the characteristic of plasticity under the application of heat. The invention deals particularly with the problem involved in edge-finishing ware with a crimped or specially-designed lip edge, where the ware is to be subjected in usage to a relatively wide and high range of temperature.

Previous to my invention, although there have been many attempts to produce a crimped or beaded edge about the mouth of a lamp chimney or similar "thermal" article of ware by so-called mechanical production methods, they have all been unsuccessful. From a practical standpoint and, as a result, it has been customary, prior to my invention, to produce the artistic finish crimped edge by hand.

In heretofore employed operations, it has been the practice to first form the article, reheat it locally about its mouth edge, and to then form a crimp edge design by employing hand tools. This, of course, requires a highly skilled workman and, regardless of the skill of the workman, inherently involves a large number of rejects. The differential heating action has to be sufficient to make possible the crimping of the edge and upon cooling I have found that localized internal stresses and strains are set up in the ware which contribute to a general fragile nature of the product and to its shortened life in usage.

A lamp chimney and similar article is repeatedly subjected to heating and cooling and thus, any weakness of nonuniformity of its stress-strain pattern will cause failure under such conditions. There have been many attempts to effect the crimping or beading operation mechanically, but I have found that all such methods heretofore contemplated or tried greatly increase the numbers of rejects and make the procedure uneconomical as compared to a hand operation; this is rather important, since a hand operation is essentially a time-consuming and an expensive one.

The practice in shaping a suitable finished lip edge by mechanical or hand methods has indicated that it is desirable to provide additional material at the localized edge area when the crimp or finish edge is being formed. This entails lapping, the problem of obtaining an effective bond, and entails difficulty in properly reheating, shaping and blending the lip edge. Whether or not an attempt is made to provide a thickened edge, there is the inherent tendency to set up a poor stress-strain pattern within the section of the material.

As far as I have been able to determine, there has been only one investigator in the art who has, in any sense, contemplated first forming the lip of the article and then blowing the article about such lip to its ultimate shape. Although this method was found to have some practicability as applied to wide mouth bottles, for example, it was found to be impractical when an attempt was made to apply it to the manufacture of a more finished type of ware, such as a lamp chimney, and one which is subjected in its usage to rather sharp variations in temperature.

I have solved the problem presented in this particular art to effectively provide an artistically finished, rounded or beaded lip edge for a glass article that is heat-resistant, and have done so automatically and without the necessity of locally reheating the article or of adding additional material during the procedure. To accomplish this result, I determined that there are important factors which have to be met, both in the construction of apparatus and in the employment of the forming procedure.

Thus, my invention pertains particularly to the discovery of a solution to the problem presented in providing a symmetric, strong, accurate, thickened, mouth rim or edge for a manufactured article and particularly, for one which is subjected to rather sharp temperature variations in its usage (a so-called "thermal" article). The solution has minimized initial rejects in the manufacture of the ware, has improved the appearance of the ware, and has provided it with a greater over-all life and strength, while at the same time, has made possible an effective reduction in its wall thickness.

It has thus been an object of my invention to provide a solution to the problem here presented.

Another object of my invention has been to discover the important factors involved and those features which are necessary in producing a better overall construction and beaded or lip edge portion for an article, such as a lamp chimney.

Another object has been to develop apparatus for carrying out the principles of my invention.

A further object has been to provide apparatus whereby a substantially completely formed finish or roll edge may be provided in an article of ware by a preliminary forming operation, and the article may be suspended as a parison from such formed edge while its body is finished or completely formed without, in any sense, damaging such body or edge and essentially, to provide an improved crimped or beaded edge construction.

A still further object has been to provide an article of ware of substantially uniform wall thickness throughout the greater portion of its extent, and having a thickened lip edge portion at one end thereof which gradually blends or converges into the body portion to produce an article having a cross-section that is substantially uniformly stressed and that is strengthened at its lip edge portion.

In the drawings, Figure 1 is a vertical view in elevation and partial section, illustrating apparatus for effecting a preliminary or parison-forming operation of my invention and showing it in an aligned but separated relationship;

Figure 3 is a vertical view in elevation and partial section through ring mold parts in their assembled relationship of Figure 2 and showing them suspending a parison during the positioning of a blow mold thereabout;

Figure 4 is a view similar to Figure 3, but showing a final step of my procedure wherein, the preliminary shape or parison is finally blown to provide a substantially completed article; in this figure, a blow head has been applied to an upper end portion of the ring mold part assembly which is still suspending the shape from and about its early-formed lip or beaded edge;

Figure 5 is a greatly enlarged fragmental view in elevation through an upper portion of a completed article, as constructed in accordance with the apparatus and procedure of Figures 1 to 4, inclusive;

Figure 6 is a top plan view taken along the line VI—VI of Figure 5 and on the same scale as that figure; and Figure 7 is a vertical view in elevation of a completed article of ware and on the same scale as the disclosure of Figure 4.

Figure 1:
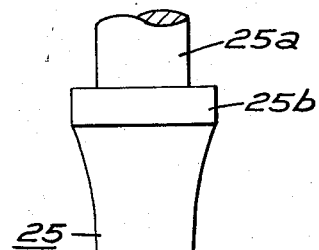
Figure 1A is a plan view taken along the line IA—IA of and on the same scale as Figure 1.
Figure 1A:
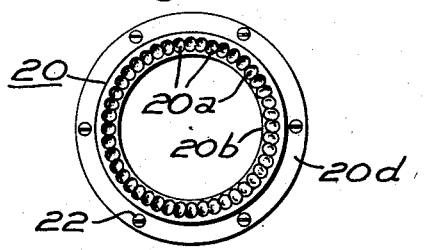

In carrying out my invention, I have found that there are a number of factors which have to be met, if a successful solution to the problem is to be obtained. In the first place, the rim or lip edge which I have also designated as a roll edge, must be substantially completely pre-formed before the body or the main portions of the article are completed or finished. In the second place, such roll edge has to be carefully formed and supported during the preliminary procedure in such a manner that the material will be moved endwise up into a partible edge-finishing mold cavity which then finish-forms and substantially encloses the edge. The edge is thickened by the operation and has a relatively thick connecting lip portion which is supported by the edge section.

Adjacent undersides of the immediate lip end, e. g., for about half the depth extent of the lip or roll edge, taken vertically thereof, should be enclosed by the surfaces of the mold cavity. It is essential that the lip edge be enclosed across the wall thickness of its top or end throughout the operation. Thus, the lip edge extends endwise along and between opposed side wall portions into a top or endwall portion of the edge-finishing mold.

It is important that no other extraneous devices, such as the presser, the blow head, etc., in any sense come into direct contact with such lip or roll edge during its formation or after it has been formed and before the article has been completely formed or blown. It is also important that the parison, as pre-formed, be carried or suspended thereabout by such mold surfaces and in such a manner that the lip or roll edge will be protected by such mold surfaces throughout the entire procedure and until after the body of the article has been formed into the desired shape of a finished article, as by a blow operation.

I thus avoid internal and surface-marring damage to the lip edge and its immediate connecting portion, and retain original heat within its thickened section to make possible an effective blending of its connecting portion into a neck portion of the completed article. That is, its retained heat is later employed in the finishing operation to substantially smoothly and uniformly continue its lip portion into the neck of the article without imparting any checks, laps, etc., or setting up a weakened area thereabout.

As a result, I have been the first to make possible the commercial production of a lamp chimney which is reinforced in section, which has no localized stresses and strains, and which has a good substantially uniform stress-strain pattern throughout its extent. Its lip edge does not require additional material over and above the initial charge or gob employed in forming a parison, and does not require any localized or other form of reheating to make it. The resultant product is much more uniform than is possible by hand operations, can be produced in greater quantity, with a minimum of rejects, and with a lessened thickness of main body but with a longer useful life.

The procedure

In carrying out the process of my invention, I first provide a gob or charge C of hot material, such as glass, which has the characteristic of plasticity under a heat application, see Figure 1. The charge is introduced in a molten condition into a blank mold through its open mouth and is then shaped, while it is still hot, by pressing it upwardly along the blank mold to form a parison or preliminary shape 26 and into a ring mold cavity to fill the latter and form an outwardly-turned or radially-projecting lip edge portion 26a, see Figure 2.

The pressing operation is conducted in such a manner as to form a hollow parison 26 of a substantially uniform and relatively heavy wall thickness along its major extent, which is greater than the contemplated thickness of the final shape or article 26' to be produced, see Figures 4 and 7, which has a radially-outwardly-projecting connecting lip portion 26b about its mouth that is of still greater thickness and is substantially completely formed, and which has a roll or lip edge portion 26a that is completely formed with crimping or beading or a series of adjacent, rounded, bead segments.

The lip portion of the parison is surrounded or enclosed along its lip edge and its outer side or diameter by partible mold surfaces that define a ring mold cavity, so that it is only subjected to the action of the presser 25 below its lip edge 26a and upon a lower portion of an inner side or diameter of its lip portion 26b. After being formed and while still hot, the parison 26 is suspended or carried by the partible mold surfaces from and about its lip portion in the same relationship as during the parison-forming operation, and while the parison is moved to a blow position and is blown to produce the finished article or shape 26', see Figure 4.

In the final or blowing operation, the major portion of the shape or body 26' is expanded and substantially uniformly decreased in thickness along its extent, with a slight tapering of thickness of the major or body portion from its neck portion 26'c into the lip portion 26'b, see Figure 4. Thus, to a slight extent, the lip portion 26'b is converged in thickness into the body portion of the article, but otherwise, has the same shape and thickness as provided by the preliminary parison-forming operation of Figure 2. At no time during the complete process, is it necessary to reheat the article in a localized manner or it its lip edge portion 26a directly exposed to the atmosphere. Upon completion of the blowing operation, the partible retaining ring molds are removed, and the completed article may then be treated or annealed as a whole in a customary manner.

It is important to contain the lip portion of the parison from the time it is formed until it is blended into the body of the finished article, in order to provide it with a symmetrical and accurate configuration of edge portion, to provide it with a good quality, thickened edge roll, lip or rim portion that blends into the body, to avoid distorting or weakening the edge portion, to provide a substantially equalized stress-strain pattern through the finished article, to avoid localized strain areas, and to assure a better appearing, less expensive and longer-life product.

More specifically, in carrying out my procedure, I employ a blank mold 10 within which a hot gob or charge C of the material is placed through its open mouth, see Figure 1 of the drawings. I then swing or move a pair of partible ring molds, parts or members 15 and 19 having complementary mold surfaces into an assembled relationship with each other and into an engaging or cooperating relationship with the mouth of the blank mold. At this time, presser 25 is then introduced into the longitudinal or axial cavity defined by the ring molds and the blank mold, to form parison 26, see Figure 2. It will be noted that the main portion of the parison has a relatively thick body that diverges upwardly-outwardly towards its mouth, is of a relatively smaller size than the final article to be produced, and has a substantially completely finished lip portion 26b and a completely formed crimped or beaded lip edge portion 26a.

In the next step, the molds 15 and 19 are moved, as a unit and without opening them with respect to each other, out of a cooperating relationship with the blank mold 10 and into an aligned and cooperating relationship with a blow mold 27, and while supporting or carrying the parison 26 about its lip portion 26b, see Figure 3. It is, of course, understood that the plunger 25 has been first withdrawn or raised out of the blank mold 10 and its cooperating ring molds 15 and 19. If a paste mold 27 is used, I provide a spacing between cooperating faces 16e and 28e, but if an iron mold is used, these two faces may be in abutment.

At this time, a blow head 32 is applied to the open upper end of the partible mold assembly and the parison 26 is then blown into the final article 26' of Figure 4. A leg or lower mouth portion of cylindrical shape 26'e is formed at the lower end of the article 26', a bowl or bulbous intermediate body portion 26'd is provided, and a narrow neck portion 26'c is formed. As shown, the portions 26'e and 26'd are of a relatively uniform thickness that is considerably less than the thickness of the parison 26. The neck portion 26'c is also of the same decreased and substantially uniform thickness near the bowl portion 26'd and has a gradually increased thickness into the lip portion 26'b.

Figure 2:
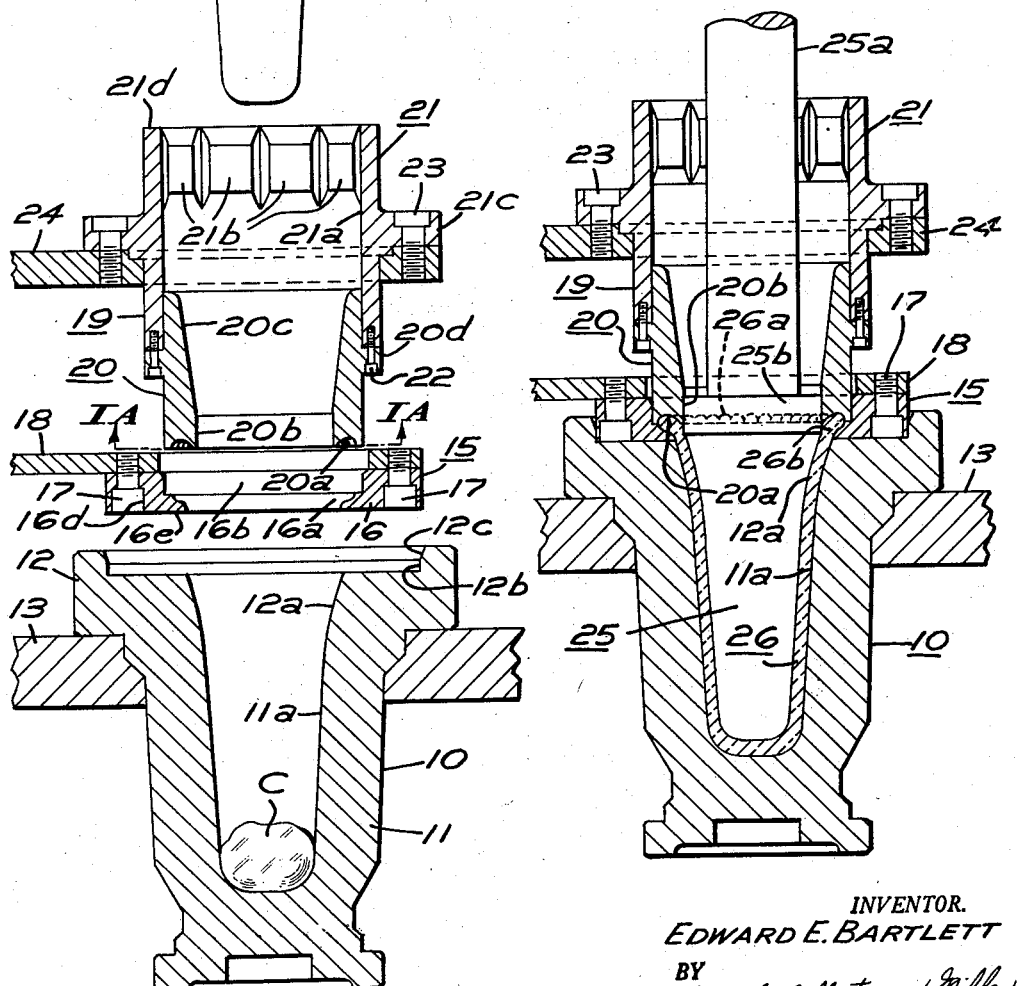
Figure 2 is a view similar to Figure 1, but showing parts of the apparatus in a parison-forming relationship in accordance with my procedure.

The lip portion 26'b, as previously pointed out, is substantially the same shape as the lip portion 26b of the operation of Figure 2, except that its extreme inner or downward end portion is beveled or substantially uniformly decreased in thickness into the neck portion 26'c. The crimped or beaded lip edge 26a is exactly of the same construction as that produced on the original parison 26.

It will be apparent that, in accordance with my process, a complete article 26' can be formed from a single charge of material, without any reheating operation, and particularly without a localized reheating operation, to provide an improved resultant product and greatly strengthened and highly accurate lip portion which has not heretofore been possible in the art. Poor stress-strain patterns within the body of the glass, such as caused by localized reheating and cooling, are entirely eliminated, and rejects are practically eliminated. Not only can a desired design of crimped or beaded edge be provided in a simple manner, but it can be accomplished to provide an article that is strengthened rather than weakened by such an operation. Furthermore, a uniformly stressed, stronger, and relatively thinner thickness of wall can be provided in a lamp chimney or similar article than heretofore possible, due to the strengthening as against the weakening effect that its lip portion has upon the body thereof.

The mechanism

Referring to Figures 1 and 2, I have shown a blank mold 10 whose wall 11 has a mold bore 11a that is closed at its lower end to receive a charge or gob of hot material C. At its upper end, the wall 11 terminates in a flange-like mouth portion 12 having a greater outward divergence of bore 12a and terminating in an enlarged cylindrical seating bore 12b and radially-outwardly diverging, cone-shaped immediate mouth bore 12c. As shown in Figure 2, the bore 12c readily passes a lower ring mold part 15, so that the cylindrical periphery of such part may seat within the bore 12b and upon the wall 12.

For forming, suspending and protecting the lip or roll edge portion 26a and its connecting lip portion 26b, I have provided a pair of cooperating and complementary ring mold members or parts 15 and 19. The upper of the two parts 19 serves, as shown in Figure 4, as a connector for a blow head 32 and, as shown in Figure 2, as a guide for a plunger 25.

The lower ring mold part 15 has a vertical wall 16 defining a bore therein made up of portions 16a and 16b. The lower bore portion 16a is rounded to define a peripheral shoulder that outwardly-diverges into a cylindrical and upper mouth bore portion 16b which serves as a seating bore for the upper mold part 19, since it defines a horizontal ledge in the wall 16 with the lower or mold portion 16a of the bore.

The blank mold 10 is carried by a support member of table 13 upon which its flange wall portion 12 rests, and the ring mold part or member 15 is carried by a swing and vertically-movable support arm or member 18. A series of peripherally spaced-apart bolt holes 16d are provided in the wall 16 to receive cap screws 17 which are threaded into the arm 18.

The upper mold part or member 19 has a lower collar-shaped portion 20, the bore 20b of whose mouth is cylindrical to serve as a slide guide for a top cylindrical band or rim portion 25b of the plunger 25 which is actuated to the forming position of Figure 2 by rod 25a. Upper bore portion 20c diverges-outwardly or is cone-shaped to facilitate the entry of the plunger 25 without interference therewith. The exposed edge or bottom face of the upper portion 20 has a series of mold depressions or adjacently-joined roll or bead mold surfaces 20a which cooperate with the mold surface portion 16a of the part 15 in a complementary manner to define a complete partible mold assembly for forming the lip edge 26a and its connecting lip portion 26b of the parison 26. It will be noted that the lip finishing mold thus-defined has, as shown in Figures 2, 3 and 4, opposed side wall portions between and along which the material is endwise-moved into abutment with a closed end wall portion. The radial-outward divergence of the mold passage or its surfaces forms a thickened and outwardly-turned lip edge portion 26a.

The upper portion 21 of the upper mold part 19 is of substantially cylindrical shape and has a cylindrical bore portion 21a and an upper, reinforced bore portion 21b. A swing and vertically-movable arm 24 is secured in position to a flange portion 21c thereof by inset cap bolts or screws 23. The portion 21 is secured at its lower edge face upon a ledge portion 20d of the lower portion 20 by means of cap screws 22 to thus provide a unitary upper mold part 19.

Referring particularly to Figures 3 and 4, I have shown a blow mold 27 having a vertical wall 28. Such wall 28 has a lower cylindrical bore 28b to form a lower mouth or leg portion 26'e of the finished article 26', an intermediate enlarged and rounded or bulbous-shaped intermediate bore portion 28b to form a rounded bowl 26'd of the finished ware, and an intermediate shoulder-forming and outwardly-diverging neck bore portion 28c which provides an outer mouth of the blow mold 27 and forms the neck portion 26'c of the ware.

In Figure 3, I have shown a slight spacing between opposed face 16e of the ring mold assembly and the face 28e of the blow mold 27 which, as disclosed in Figure 4, is of a relatively short distance to prevent undesirable attenuation of the cross-section of the parison 26 when it is being formed into the finished article 26'.

I have provided blow mold 27 which may be of a hinged, two-part, substantially conventional construction. One mold part or half may be mounted within an open slotted portion of and on a support table 30 by cap screws 31 and the other half, after being unlatched from the one half, may be swung outwardly to an open position with respect to the one or mounted half. A removable bottom plate or member 29 is shown secured to the one mold part or half by cap screws 29a, so that the other half is free for opening and closing movement with respect thereto.

In Figure 4, a blow head 32 having a sealing and positioning plate 33, is provided with an annular groove in its lower face to receive gasket ring 34 that seats upon the upper edge 21d of the ring mold assembly. A blow pipe 37, connected to suitable source of air, has a boss 35 whose inner face is of cone-shape and which carries an inset sealing gasket ring 36. The ring 36 abuts against an outwardly-diverging cone-shaped bore portion 33b of the support plate 33 to, with the gasket 34, seal off the unit during the blowing operation and position such blow head unit well above and out of contact with the parison 26 which is to be blown. It will be noted that the internal bore of the pipe 37 cooperates with mouth bore portion 33a of the plate 33 to supply air through the upper mouth portion of the parison, but below its previously-formed roll or lip edge 26a.

It should be noted that a bottom or base portion 26'f of the shape of Figure 4 is removed or is trimmed off in any conventional manner, as by burning it off, to provide the finished article of Figure 7.

What I claim is:

1. A shaping device for making a hollow-shaped heat-resistant relatively thin-wall article such as a lamp chimney with a relatively thick and crimped lip edge portion from a molten charge of a vitreous or plastic material which comprises, a pair of interfitting ring molds to cooperate with an open mouth mold and receive molten material therefrom to shape and carry a crimped and thickened lip edge portion of a wall body, one of said ring molds having a hollow bore therethrough which is of substantially cylindrical shape at its lower end portion to cooperate with and be engaged by a blank presser, said bore diverging from said cylindrical portion toward its upper end to provide clearance spacing for the introduction of the presser, said ring molds having radially-outwardly-projecting interfitting edge mold portions defining a lip-edge-forming cavity therebetween, one of said edge mold portions having a series of beaded portions therealong, and said edge mold portions of said ring molds defining an open annular passageway radially-inwardly and downwardly from the lip-edge-forming cavity therebetween.

2. A shaping device for making a hollow-shaped relatively thin-wall heat-resistant article such as a lamp chimney from vitreous or plastic material in a molten condition which comprises, a body-shaping bottom mold, a pair of interfitting ring molds to cooperate with an open mouth of the bottom mold and receive molten material therefrom to shape and carry an upper lip edge portion of a parison body, an upper one of said ring molds having a molding portion provided with an annular series of bead-half mold depressions on its underside, a lower ring mold of said pair having a molding portion provided with an annular depression on its upper side cooperating with the molding portion of the upper ring mold to define a cavity to finish-shape a lip edge portion of a parison body, and said pair of molds defining an annular parting line therebetween that is positioned substantially along the underside of the molding portion of said upper ring mold to define a parting line below the top of a lip edge portion and along the base of half-beads formed by said pair of ring molds.

3. A shaping device for making a hollow-shaped heat-resistant relatively thin-wall article such as a lamp chimney with a relatively thick edge portion from a molten charge of vitreous or plastic material which comprises, a pair of interfitting ring molds to cooperate with an open-mouth mold and receive molten material therefrom to shape and carry a thickened lip portion of a wall body, one of said ring molds having a top lip-edge-forming portion and a molding portion provided with an annular series of bead-like mold depressions therein, the other ring mold of said pair having a mold portion provided with an annular depression on one side cooperating with the forming and molding portions of the one ring mold to define a cavity for finish-shaping a lip edge portion of the wall body, and said pair of ring molds defining an annular parting line therebetween that is positioned substantially below the top of the lip edge forming portion and along the base of the bead-like mold depressions.

4. A shaping device for making a hollow-shaped relatively thin-wall heat-resistant article such as a lamp chimney from vitreous or plastic material that attains plasticity in a heated condition which comprises, mold and press means to preliminarily shape a molten charge into a hollow substantially cone-shaped parison body of substantially uniform temperature and uniform relatively heavy-wall thickness, a pair of cooperating ring molds for enclosing and finish-forming a relatively heavy-wall top lip edge portion about the parison, one of said ring molds having bead-shaped portion therein to form a series of annularly-positioned beads along the lip edge portion simultaneously with the forming of the top lip edge portion, said ring molds having edge portions defining an open annular passageway radially-inwardly and in a spaced relationship from the lip edge and that define a cavity between the ring molds and provide a parting line along the base of the bead-shaped portion of the one ring mold, and said ring molds being constructed to suspend the parison body from the completed lip edge portion after the lip edge portion has been formed and before the parison has been completely formed into an article.

References Cited in the file of this patent

UNITED STATES PATENTS

| | | |
|---|---|---|
| 1,013,451 | Schram | Jan. 2, 1912 |
| 1,527,947 | Woods | Feb. 24, 1925 |
| 1,675,971 | Cornwell | July 3, 1928 |
| 2,008,312 | Peiler | July 16, 1935 |
| 2,013,382 | Garwood | Sept. 3, 1935 |
| 2,204,151 | Rodefer et al. | June 11, 1940 |
| 2,523,737 | Tourres | Sept. 26, 1950 |
| 2,688,823 | Weber | Sept. 14, 1954 |